US005123458A

United States Patent [19]

Collard

[11] Patent Number: 5,123,458

[45] Date of Patent: Jun. 23, 1992

[54] BEVERAGE DISPENSING METHOD

[75] Inventor: Brian L. Collard, Littleton, Colo.

[73] Assignee: Multi-Pour, Inc., Littleton, Colo.

[21] Appl. No.: 579,024

[22] Filed: Sep. 7, 1990

[51] Int. Cl.[5] ........................ F16K 31/12; B65B 1/04; B65B 3/04

[52] U.S. Cl. ........................................ 141/1; 141/237; 137/883; 222/1; 222/482

[58] Field of Search ................................ 141/234-237, 141/1, 9, 107, 244; 137/206, 883; 222/300, 301, 478, 485, 488, 1, 482

[56] References Cited

U.S. PATENT DOCUMENTS

| | | | |
|---|---|---|---|
| 144,565 | 11/1873 | Roos | 137/883 |
| 582,769 | 5/1897 | Wank | 141/234 X |
| 667,108 | 2/1901 | Clavez | 141/234 |
| 699,917 | 5/1902 | Gruenebaum | 141/236 X |
| 1,099,713 | 6/1914 | Morris | 137/883 |
| 1,750,485 | 3/1930 | Muller, Jr. | 137/883 |
| 2,056,191 | 10/1936 | Peltz | 141/237 X |
| 2,298,119 | 10/1942 | Gebert | 141/237 X |
| 4,079,761 | 3/1978 | Herbst, Sr. | 141/237 X |

FOREIGN PATENT DOCUMENTS

| | | | |
|---|---|---|---|
| 58771 | 4/1891 | Fed. Rep. of Germany | 141/234 |
| 263962 | 4/1929 | Italy | 141/237 |
| 61719 | 1/1940 | Norway | 141/237 |
| 380854 | 9/1932 | United Kingdom | 141/237 |

*Primary Examiner*—Michael S. Huppert
*Assistant Examiner*—Kenneth DeRosa
*Attorney, Agent, or Firm*—Brian D. Smith

[57] ABSTRACT

Disclosed are a spout and a method for simultaneously dispensing beverage into a plurality of drinking glasses or a single drinking glass. The spout includes a housing having a first portion defining a beverage receiving chamber with a beverage inlet for receiving beverage. The housing also has a second portion defining at least two beverage dispensing chambers, each of which has a beverage exit for dispensing beverage. The beverage dispensing chamber is in fluid communication with the beverage receiving chambers for receiving fluid from the beverage receiving chamber. The second portion of the housing has at least two spout sections, each of which defines one of the beverage dispensing chambers and one of the fluid exits. The spout sections are selectively spaced from each other to enable the adjacent rims of at least two conventional drinking glasses held side by side with respect to each other to be located between the selectively spaced spout sections so that the all drinking glasses can be filled simultaneously with beverage flowing through the spout. The spout sections are also sized, configured and selectively spaced from each other to enable the spout sections to fit inside the rim of a single drinking glass so that the single drinking glass can be filled with beverage flowing through all spout sections.

2 Claims, 2 Drawing Sheets

FIG. 1
(PRIOR ART)
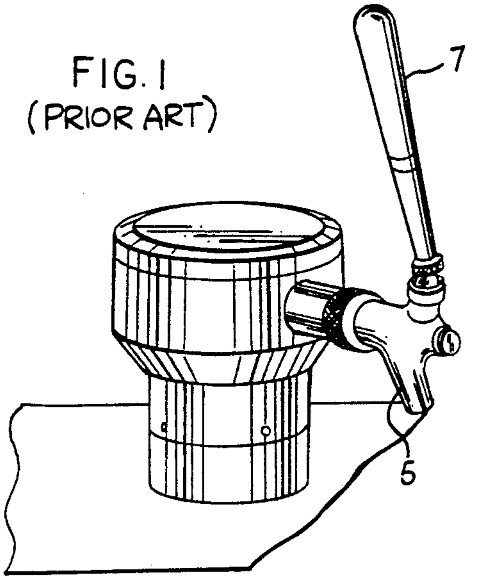
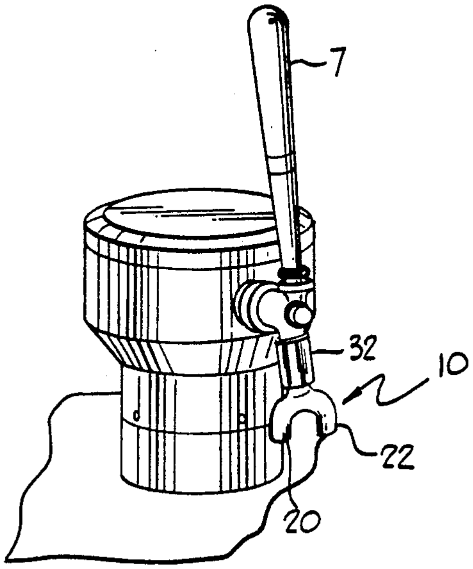
FIG. 2
FIG. 3
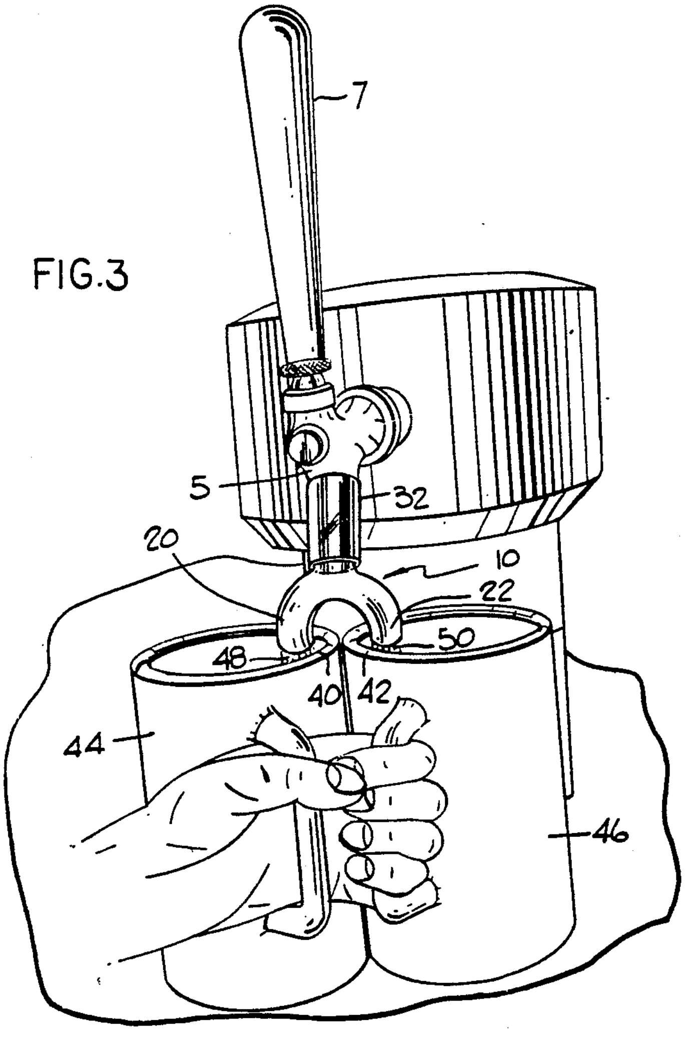
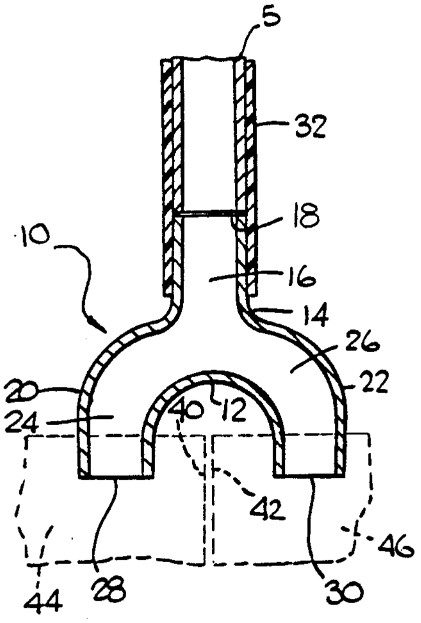
FIG. 4

BEVERAGE DISPENSING METHOD

TECHNICAL FIELD

The invention relates generally to beverage spouts, and more particularly, to beverage spouts and methods of pouring beverages into two or more glasses simultaneously.

BACKGROUND OF THE INVENTION

There are many spouts for dispensing beverages such as soda, beer, and liquor. To the best of the knowledge of the inventor of the present invention, no spouts have heretofore been developed for simultaneously dispensing beverages into two or more beverage glasses.

SUMMARY OF THE INVENTION

The present invention addresses the aforementioned need by providing a spout for simultaneously dispensing beverage into at least two drinking glasses. The spout includes means for receiving beverage and means in communication with said beverage receiving means for simultaneously dispensing at least two selectively spaced streams of beverage. The beverage streams are selectively spaced to enable the streams to be simultaneously collected together in a single conventional drinking glass or simultaneously collected separately in separate beverage glasses properly positioned under the streams.

The present invention also provides a method for simultaneously dispensing beverage into two or more drinking glasses. The method includes providing a spout as described above having means for receiving beverage and means in communication with the beverage receiving means for dispensing at least two selectively spaced streams of beverage. The method also includes positioning the drinking glasses under the beverage streams so that each stream is collectable in a different drinking glass. The method also contemplates simultaneously collecting all streams together in one drinking glass that is properly positioned under the streams.

In a preferred embodiment of the invention, the spout includes means for receiving beverage and first spout means in communication with the beverage receiving means for dispensing a first stream of beverage. Second spout means in communication with said beverage receiving means is also provided for dispensing a second stream of beverage. The first and second spout means are selectively spaced from each other so that the adjacent rims of two conventional drinking glasses held side by side can be located between the first and second spout means, thereby enabling beverage flowing through the first spout means to be collected in one of the drinking glasses while beverage flowing through the second spout means is collected in the other drinking glass. The first and second spout means are also sized, configured and spaced from each other so as to enable both spout means to fit inside the rim of a single drinking glass so that beverage flowing through both spout means can be collected in a single drinking glass.

BRIEF DESCRIPTION OF THE DRAWINGS

FIG. 1 is a perspective view of a prior art beer tap having a spout.

FIG. 2 is a perspective view illustrating a spout adapter of the present invention attached to the spout of FIG. 1.

FIG. 3 is a perspective view illustrating the spout adapter of FIG. 2 simultaneously dispensing beverage into two mugs which are positioned below the spout adapter.

FIG. 4 is a partial cross-sectional view illustrating the spout adapter shown in FIG. 3 with the mugs of FIG. 3 illustrated in phantom;

BEST MODE FOR CARRYING OUT THE INVENTION

Figure 5:
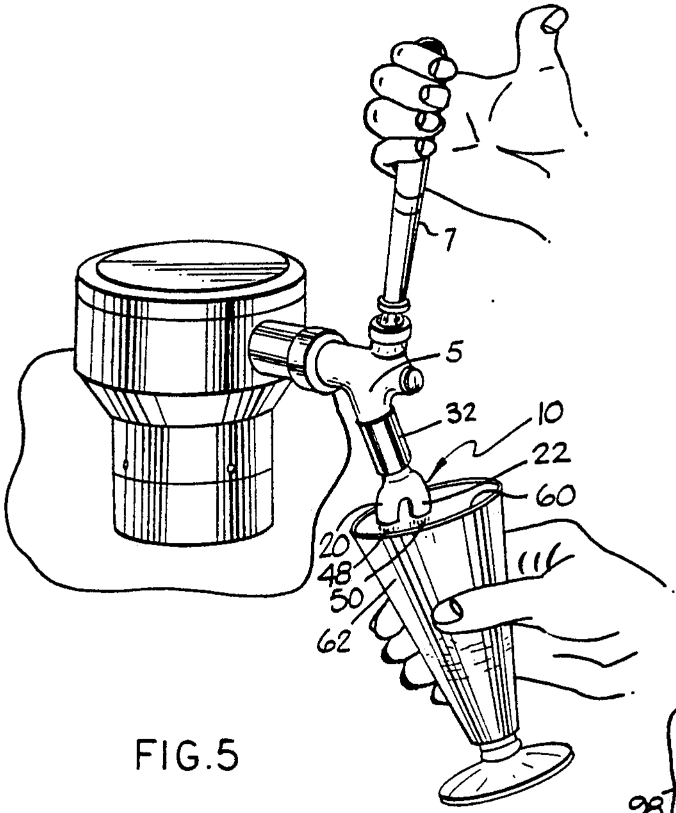
FIG. 5 is a perspective view illustrating the spout adapter of FIG. 2 dispensing beverage into a single drinking glass.

FIG. 1 illustrates a conventional beverage spout 5 having a handle 7 for controlling an internal on/off valve (not shown) located in spout 5 to control the flow of beverage through the spout.

FIG. 2 illustrates a spout adapter 10 of the present invention for attachment to conventional spout 5. As best shown in FIG. 4, adapter 10 comprises a housing 12 having a first portion 14 defining a beverage receiving chamber 16 having a beverage inlet 18. Housing 12 also has a second portion (not numbered) which includes two spout sections 20 and 22. Spout sections 20, 22, respectively, define beverage chambers 24 and 26 which terminate, respectively, at beverage exits 28 and 30. As illustrated, beverage dispensing chambers 24 and 26 are in fluid communication with beverage receiving chamber 16 and, thus, are capable of receiving beverage from beverage receiving chamber 16.

Spout adapter 10 is attached to conventional spout 5 by a flexible collar 32 preferably made of Neoprene. Collar 32 is sized and configured to fit snugly on the end of tap 5 and the area of first portion 14 defining inlet 16 to tightly secure adapter 10 to spout 5 (in the end to end abutting relationship shown in FIG. 4) and to prevent beverage from leaking through the joint made by spout 5 and adapter 10.

Spout sections 20 and 22 are also sloped as illustrated to facilitate drainage of beverage from the spout when handle 7 is moved to the off position.

The Figures also illustrate that spout sections 20 and 22 are, in accordance with an important aspect of the present invention, selectively spaced from each other to enable the adjacent rims 40 and 42 of two conventional drinking glasses 44 and 46, respectively (see FIGS. 3 and 4) held side by side as indicated in FIGS. 3 and 4 to be located between spout sections 20 and 22. This enables beverage stream 48 flowing through spout section 20 to be collected in drinking glass 44 and beverage stream 50 flowing through spout section 22 to be collected in drinking glass 46. Spout sections 20 and 22 are also sized, configured and spaced from one another so that both spout sections 20, 22 are capable of fitting inside the rim 60 of a single drinking glass 62 (as illustrated in FIG. 5) to enable both beverage streams 48 and 50 to be collected together in drinking glass 62. The drinking glasses to which the present invention pertains typically have an outside diameter ranging between about 1½ inches to about 3½ inches.

Spacing between spout sections 20 and 22 that has been found to accommodate both objectives of the present invention outlined above (i.e. the filling of one or more glasses simultaneously) ranges between about ¼ and 1 inch (preferably about ½ to ⅞ of an inch) when the outside diameter of each spout section is between about 3/16 and ½ inches. An optimum spacing found for spout sections having a 7/16 inch outside diameter is 13/16 of an inch. As used herein, spacing means the gap or the distance between the outside surfaces of spout sections 20 and 22.

Figure 6:
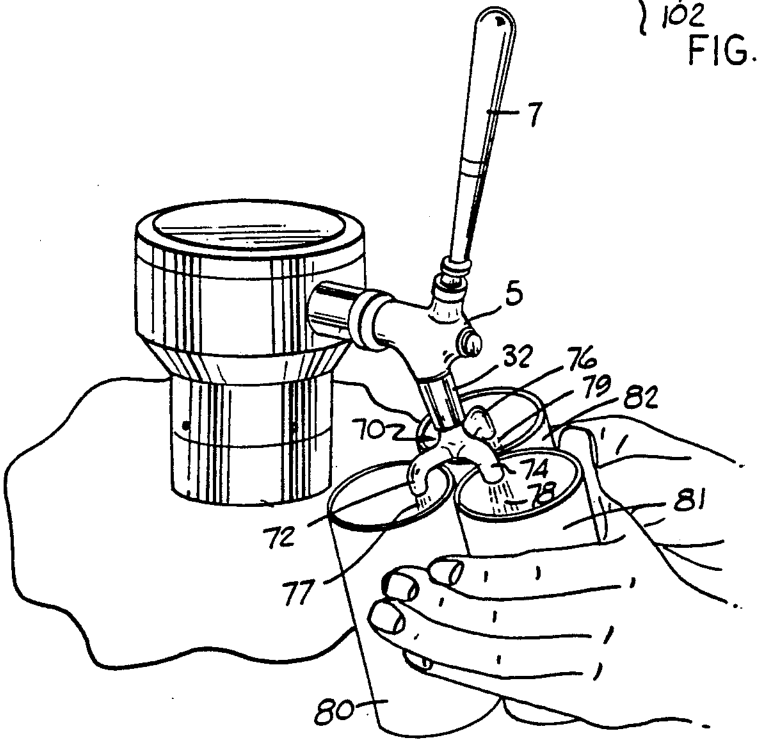
FIG. 6 is a perspective view of another spout adapter of the present invention attached to the spout of FIG. 1 for simultaneously dispensing beverage into three beverage mugs.

FIG. 6 illustrates a spout adapter 70 of the present invention for dispensing beverage into three drinking glasses simultaneously. Adapter 70 is provided with three spout sections 72, 74, and 76 each of which is identical to the spout sections 20, 22 of spout adapter 10 with the exception that spout sections 72, 74, and 76 are selectively spaced from one another to enable the rims of the three drinking glasses to be positioned under the spout sections as illustrated in FIG. 6. As such, beverage streams 77, 78 and 79 flowing through spout sections 72, 74 & 76 are capable of being simultaneously collected separately in the three drinking glasses 80, 81, 82 positioned under the streams. Spout sections 72, 74 and 76 are also sized, configured, and spaced from one another so that all three spout sections are capable of fitting inside the rim of a single drinking glass (not shown) to enable beverage flowing through said spout sections to be collected in a single drinking glass.

Figure 7:
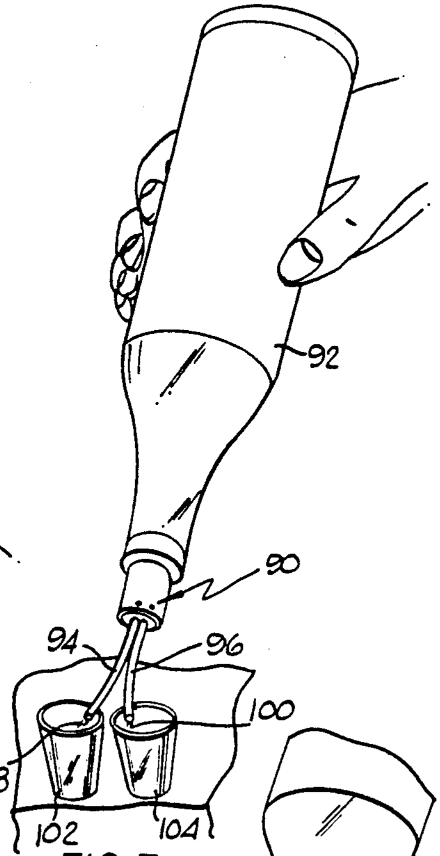
FIG. 7 is a perspective view illustrating yet another spout of the present invention for attachment to a bottle for simultaneously dispensing beverage into two shot glasses.
Figure 8:
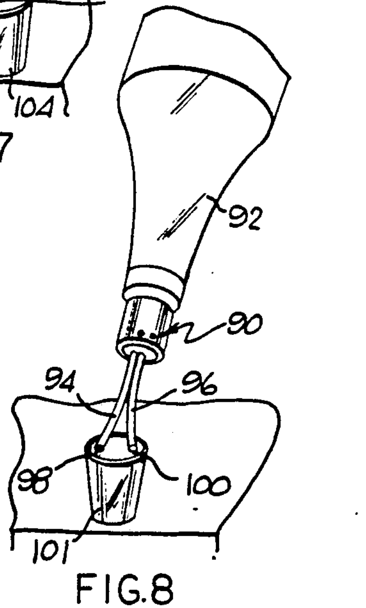
FIG. 8 is a perspective view of the spout of FIG. 7 showing the spout filling a single shot glass.

FIGS. 7 and 8 illustrate a spout 90 of the present invention for attachment to a conventional bottle 92 such as a liquor bottle. Spout 90 includes two spout sections 94 and 96 which are selectively spaced from one another and angled with respect to each other to dispense beverage streams 98 and 100 into a single drinking glass properly positioned under the streams such as the shot glass 101 as illustrated in FIG. 8. Spout sections 94 and 96 are also selectively spaced to enable the beverage streams to be simultaneously collected separately in two drinking glasses such as shot glasses 102 and 104 which are properly positioned under the streams as illustrated in FIG. 7. Spacing between spout sections 94 and 96 that is believed to provide good results ranges between about ¼ to ½ inch. The internal valve mechanism of spout 90 is mechanically similar to those of commercially available spouts having single spout sections such as those sold under the trademark "Cheap Shot" by S. R. Products of Minneapolis, Minn.

This invention has been described in detail with reference to particular embodiments thereof, but it will be understood that various other modifications can be effected within the spirit and scope of this invention.

I claim:

1. A method for dispensing beverages into conventional drinking glasses comprising:

providing a spout having means for receiving beverage and means in communication with said beverage receiving means for dispensing at least two selectively spaced streams of beverage, the beverage streams being selectively spaced to enable the streams to be simultaneously collected together in one drinking glass properly positioned under the streams, the beverage streams also being selectively spaced to enable the streams to be simultaneously collected separately in two or more drinking glasses properly positioned under the streams;

providing drinking glasses having an outside diameter between about 1½ inches and 3½ inches;

positioning the drinking glasses under the means for dispensing the beverage streams so that each stream is collectable in a separate drinking glass;

dispensing beverage from the spout so that each stream is collected in a separate drinking glass;

removing the drinking glasses separately collecting the streams from their positions under the dispensing means;

positioning a single drinking glass under the dispensing means so that all beverage streams are collectable in the single drinking glass; and dispensing beverage from the spout so that all beverage streams are collected in the single drinking glass.

2. A method as claimed in claim 1 wherein the drinking glasses have the same outside diameter.

* * * * *